Nov. 26, 1968          F. W. NEWBURGH                 3,412,648
                   ISOCHRONOUS-DROOP GOVERNOR
Filed Feb. 10, 1966                              2 Sheets-Sheet 1

INVENTOR
Fred W. Newburgh
By Wolfe, Hubbard, Voit & Osann
ATTORNEY

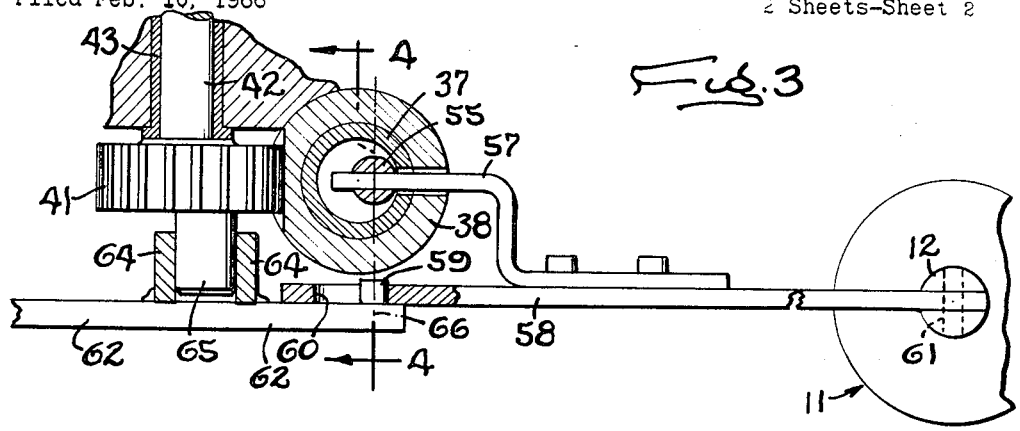
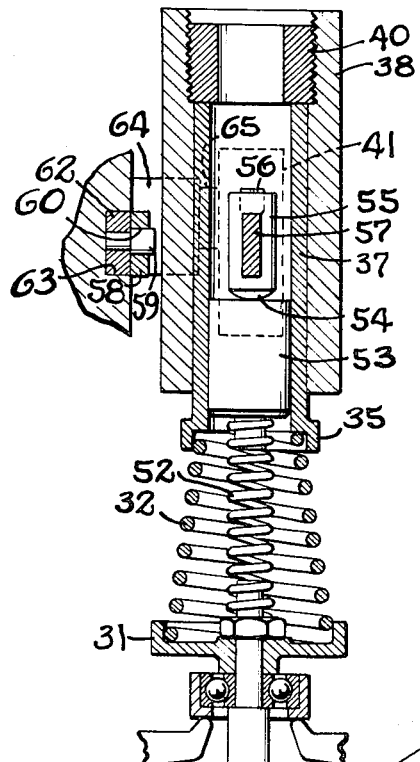
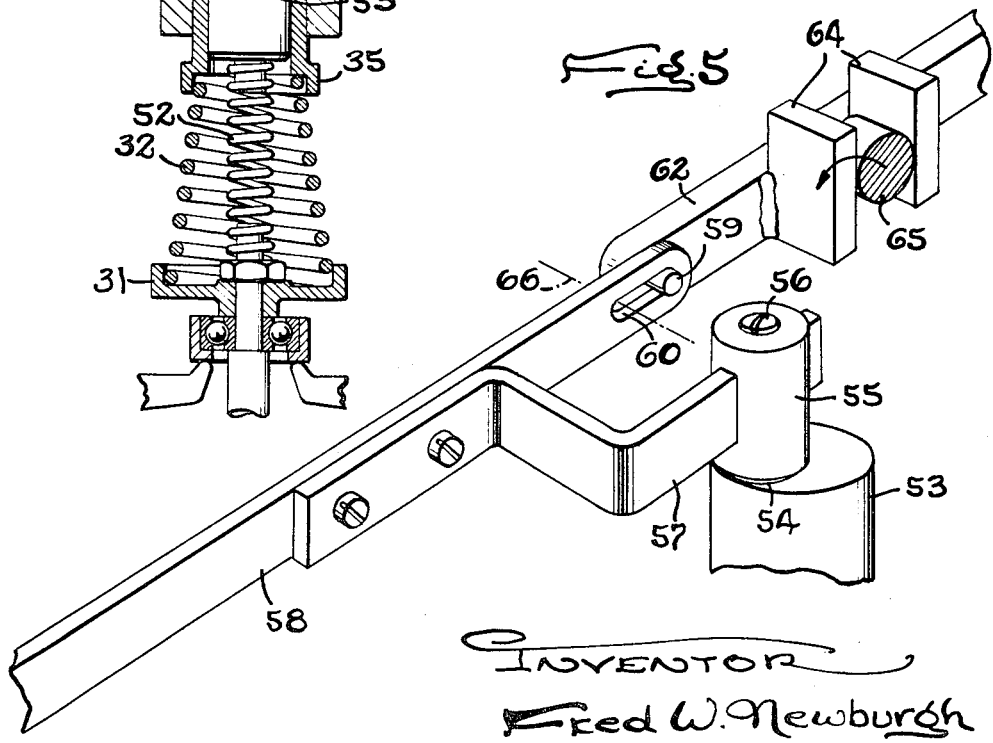

United States Patent Office 3,412,648
Patented Nov. 26, 1968

3,412,648
ISOCHRONOUS-DROOP GOVERNOR
Fred W. Newburgh, Rockford, Ill., assignor to Woodward Governor Company, Rockford, Ill., a corporation of Illinois
Filed Feb. 10, 1966, Ser. No. 526,490
14 Claims. (Cl. 91—366)

ABSTRACT OF THE DISCLOSURE

A speed governor of conventional isochronous type controlling the position of a servo actuator with a pilot valve positioned by a centrifugal speed sensor and an opposing speeder spring, and including hydraulic compensating action for maintaining isochronous operation. A droop mechanism transmits motion of the servo actuator with a variable ratio to a speed setter to override the compensating mechanism and impart varying speed droop to the governor in a portion of its speed range, and is disabled by reduction of the ratio substantially to zero automatically in response to adjustment of the speed setter to a selected position.

---

This invention relates to a governor for regulating the speed of a prime mover so as to provide constant speed or isochronous operation under all loads at certain times and droop or proportional governing for producing more stable operation at other times. The invention is especially adapted for use with a governor having a selectively adjustable speed setter for varying the prime mover speed maintained by the governor.

The primary object is to utilize the movements of the speed setter of the governor to change from droop to isochronous operation and vice versa.

Another object is to provide for isochronous operation at a particular operating speed and for progressively decreasing the droop as the speed setter is moved toward the position for maintaining such speed.

A further object is to provide for maximum speed droop at the lower speed settings of the governor and progressively decrease the amount of the droop as the setting is increased to a higher normal operating speed at which the governor operates isochronously.

The invention also resides in the novel character of the structure for varying the speed droop and changing to isochronous operation.

Other objects and advantages of the invention will become apparent from the following detailed description taken in connection with the accompanying drawings, in which FIGURE 1 is a fragmentary sectional view and hydraulic circuit diagram of a speed governor embodying the novel features of the present invention.

FIGS. 2 and 3 are fragmentary sections taken along the line 2—2 of FIG. 1 showing different positions of the parts.

FIG. 4 is a fragmentary section taken along the line 4—4 of FIG. 3.

FIG. 5 is a fragmentary perspective view.

Figure 1:
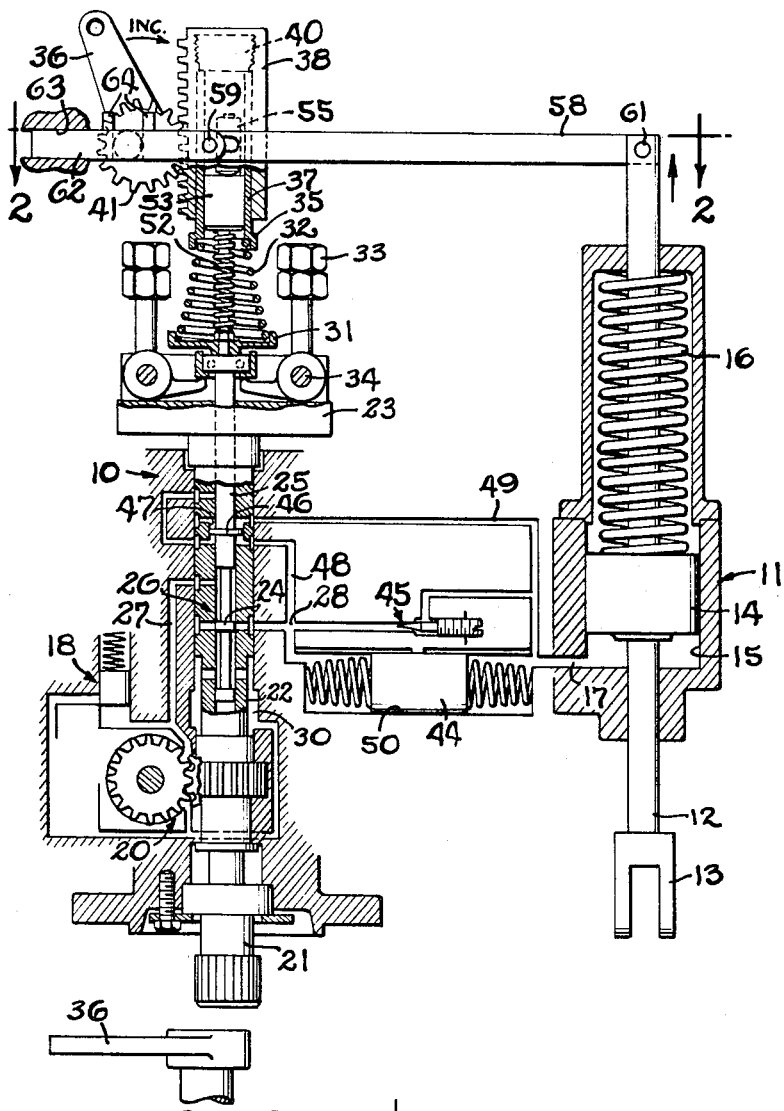

In the governor shown in the drawings to illustrate the present invention, the operating parts are mounted in a casing 10 and include a servo actuator 11 whose output rod 12 is coupled at 13 and through suitable linkage to the throttle or other device for regulating the supply of fuel or other energy medium to the prime mover whose speed is to be governed. The actuator shown is of the single acting hydraulic type comprising a piston 14 reciprocable in a stationary cylinder 15 supported within the casing 10 which may be mounted on the engine. The regulator rod 12 is urged by a compression spring 16 in the speed-decreasing direction, that is, downwardly in the present instance. Fluid under pressure is introduced into or withdrawn from the rod end of the cylinder through a passage 17 to control the energization of the servo and therefore the position of the regulator rod.

The speed governor shown herein is of the isochronous type as disclosed in Patent 2,478,753, to which reference may be had for further details. Oil contained within the governor casing 10 is placed under a constant pressure by a spring loaded by-pass valve 18 and a gear pump 20 driven by the engine through a shaft 21 coupled to a ported sleeve 22 carrying the governor ball head 23 and cooperating with a land 24 on a stem 25 to form a pilot valve 26. The latter controls the flow of pressure fluid from the supply line 27 to a space 28 or the escape of fluid from this space to a drain space 30.

The valve stem is slidable in the sleeve 22 and fixed at its upper end to a head 31 urged downwardly by a compression type speeder spring 32 and upwardly by centrifugal force derived from flyweights 33 fulcrumed at 34 on the rotating ball head 23. The stress of the spring and therefore the setting of the governor to maintain different desired engine speeds is determined by the position of an abutment 35 adjustable in this instance by a manually actuated lever 36. Herein, the abutment is on the lower end of a tube 37 slidable in a sleeve 38 and positioned therein by a screw 40. Rack teeth along the sleeve mesh with a pinion 41 on the inner end of a shaft 42 journaled in a bearing 43 in the casing and fast at its outer end to the hub of the speed adjusting lever 36.

In the present instance and as described more fully in the aforesaid patent, isochronous operation of the prime mover is produced by the governor by transmitting the pressure changes in the valve controlled space 28 to the servo cylinder 15 through the medium of a spring loaded buffer piston 44 cooperating with a flow restricting orifice 45 and the fluid passages shown to derive a pressure differential as an incident to each corrective action of the governor. These differentials are in opposite senses for speed increases and decreases detected by the governor and are applied to a piston 46 on the valve stem 25 in a direction to return the land 24 to neutral position following each speed change. The piston 46 receiving the force for thus modifying the force of the speeder spring is slidable in a cylinder 47 which communicates at its lower end through a passage 48 with the space 28, one side of the orifice 45 and one end of a cylinder 50 in which the buffer piston 44 reciprocates. A free passage 49 connects the upper end of the compensating cylinder 47 with the servo cylinder 15 and the other end of the buffer cylinder 50.

As a result, the pressure differential developed between the space 28 and the servo cylinder with each speed change detected by the governor and applied to the compensating piston 46 changes the force opposing the flyweight force and imparts to the governor a temporary drooping characteristic which stabilizes the action of the governor in correcting for the detected speed change. This modifying force is then dissipated by gradual leakage of fluid between opposite ends of the cylinder 50 and through the restriction 45. As a result of these combined effects or so-called compensating action, the governor varies the energization of its servo 11 and the energy supply to the prime mover so as to maintain isochronous operation thereof at all speed settings of the governor and under all loads on the prime mover.

The present invention contemplates an addition to the isochronous governor above described of mechanism which utilizes the movements of the speed setter 36 to override or disable the compensating mechanism above described and impart speed droop to the governor in certain portions of its speed range so as to provide optimum stability of operation while automatically transferring to and maintaining the isochronous operation in other parts of the speed range. The overriding action produced by the mechanism herein disclosed is especially adapted for use with prime movers such as gas turbines whose operation is more or less unstable during starting and at speeds substantially below the normal or most efficient operating speed. Accordingly, the disclosed mechanism functions to impart maximum droop to the isochronous governor at low speed settings of the governor, reduce the amount of droop progressively as the governor speed setting is increased and substantially cancel out the droop and provide isochronous operation at or near the speed at which the prime mover is normally operated in service.

To the foregoing ends, provision is made for maintaining the speeder spring force at the lowest value when the speed setting of the governor is low as shown in FIG. 1 and decreasing this force progressively with the speed-increasing movement of the servo and the increase in the governor speed setting until normal operating speed is attained at which the speed droop of the governor is zero and the servo movements are no longer effective in producing droop. Herein, the droop producing mechanism operates through the medium of a second and compression spring 52 which supplements the force of the main spring 32 and acts between the abutment 31 and a plunger 53 slidable in the tube 38. The upper end of the plunger bears against the lower rounded end 54 of an actuator in the form of a block 55 clamped by a screw 56 to an extension 57 on the free end of a lever 58 fulcrumed on a pin 59 disposed in a slot 60 extending along the lever end. The lever extends horizontally from the pin and at its opposite end is pivotally connected at 61 to an upward extension of the rod 12 of the servo piston.

The pin 59 projects from the side and at one end of a support bar 62 alined with the lever 58 whose other end slides in a guide 63 on the casing to support the lever for endwise movement. Intermediate the ends of the support bar are laterally projecting lugs 64 which constitute followers bearing against opposite sides of an eccentric 65 projecting from the pinion 41 and offset from the axis thereof.

Figure 2:
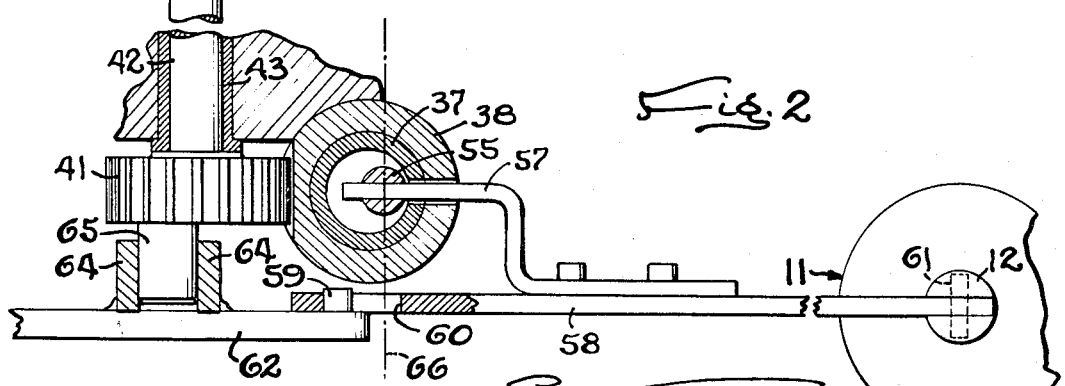

The arrangement of the slot 60, the pin 59 and the end 54 of the block 53 is such that when the speed setter 36 is set as shown in FIGS. 1, 2 and 5, for maintaining a low starting speed, the fulcrum pin 59 will be disposed in the outer end of the slot 60. The pin is then spaced a maximum distance from a plane 66 (FIG. 2) through the point at which the end 54 of the block 55 bears down against the plunger 53 so that the motion of the servo piston is transmitted to the spring 52 at a maximum ratio. Thus, in the downward fuel-increasing and upward fuel-decreasing movements of the servo piston in response to increases and decreases detected by the governor in the prime mover speed relative to the prevailing governor speed setting, the lever 58 will be rocked clockwise and counter-clockwise respectively thus correspondingly increasing and decreasing the compression of the spring 52 and the effective speed setting of the governor to impart a maximum amount of droop to the governor so as to provide optimum stability in regulating the speed of the prime mover.

Stressing of the spring 52 is similarly changed after adjustment of the speed setter for maintaining a higher speed of the prime mover. But the amount of the speed droop will be less since, in the clockwise adjustment of the speed setter 36, the fulcrum pin 59 is moved along the slot 60 closer to the plane 66 thus reducing the motion transmitting ratio of the lever 58. Such reduction in the amount of speed droop continues progressively as the swinging of the speed setter is continued to increase the fuel flow and therefore the speed of the prime mover.

In these adjustments, the fulcrum pin 59 moves along the slot 60 toward the plane 66. Finally, when the speed setting has been increased to the normal most efficient operating speed of the prime mover, the pin 59 will reach the plane 66 so that the motion transmitting ratio of the lever 58 will be reduced to zero and the back and forth movements of the servo piston to correct for load changes detected by the governor will not change the position of the block 55 and the stressing of the spring 52. As a result, the droop producing action is canceled out and the action of the compensating mechanism is restored so as to condition the governor for producing true ischronous operation of the prime mover.

It will be apparent from the foregoing that by changing the construction and location of the lever 58, the bar 62 and the eccentric 65, the part of the speed range in which the compensating mechanism is effective to produce isochronous operation of the prime mover may be changed to suit the operating conditions and characteristics of the prime mover to be controlled by the governor. Similarly, the part of the range over which the speed droop is produced and the rate of change thereof may also be changed in accordance with the prime mover characteristics.

I claim as my invention:

1. A speed governor having, in combination, a power servo having a driven member adapted for connection with an energy supply regulator of a prime mover and movable back and forth in speed increasing and decreasing directions, a speed sensor adapted to be driven by said prime mover and having a speed setter selectively movable back and forth for adjusting the governor for maintaining different prime mover speeds over a relatively wide range, means actuated by said sensor and controlling the energization of said servo for respectively moving said member in the speed increasing and decreasing directions as the speed detected by said sensor falls below and rises above the prevailing speed setting of the sensor, means responsive to each speed change detected by said sensor to modify the adjustment of the sensor to bring the prime mover back to a constant speed corresponding to the prevailing adjustment of said setter whereby to provide for isochronous operation of the prime mover, droop mechanism responsive to the movements of said servo member and operable to override said last mentioned means and modify the speed setting of the governor and impart a speed droop characteristic to the governor, and means responsive to the movements of said speed setter and operable on said droop mechanism to change the magnitude of said speed droop progressively with the movements of the setter and disable said droop mechanism to substantially cancel out the droop in one position of the setter.

2. A speed governor as defined in claim 1 in which said droop mechanism acts on said speed sensor through the medium of a spring to which the movement of said servo member is transmitted in a ratio which decreases progressively to substantially zero with the movement of said speed setter from low to high speeds.

3. A speed governor as defined in claim 1 in which the changing speed droop of the governor is achieved through a spring acting between said sensor and an abutment which is moved by said servo member through the medium of a connection including a lever whose motion transmitting ratio is decreased progressively as the speed setting of the governor is increased by said speed setter and said ratio is substantially zero at a predetermined setting for normal speed operation whereby to disable said connection and cancel out said speed droop and provide isochronous operation of the governor at such setting.

4. A speed governor having, in combination, a power servo having a driven member adapted for connection with an energy supply regulator of a prime mover and movable back and forth in speed increasing and decreasing directions, a speed sensor adapted to be driven by said prime mover and having a speed setter selectively movable back and forth between spaced positions for adjusting the governor for maintaining a low starting speed and a high desired operating speed, means actuated by said sensor and controlling the energization of said servo for respectively moving said member in the speed increasing and decreasing directions as the speed detected by said sensor falls below and rises above the prevailing speed setting of the sensor, means responsive to each speed change detected by said sensor to modify the adjustment of the sensor to bring the prime mover back to a constant speed corresponding to the prevailing adjustment of said setter whereby to provide for isochronous operation of the prime mover, droop mechanism responsive to the movements of said servo member and operable to override said last mentioned means and modify the speed setting of the governor and impart a speed droop characteristic to the governor, and means responsive to movements of said speed setter and operable on said droop mechanism to reduce said speed droop characteristic progressively as the speed setting of the governor is increased, the droop being substantially zero when said speed setter is in said high operating speed position.

5. A speed governor having, in combination, a power servo having a driven member adapted for connection with a speed regulator of a prime mover and movable back and forth in speed increasing and decreasing directions, a rotary speed sensor adapted to be driven by said prime mover to derive a control force which increases and decreases with the sensor speed, a speeder spring opposing said control force and exerting a force determined by the position of first and second movable abutments, a speed setter selectively adjustable to move said first abutment back and forth between a first speed setting and a second speed setting, means actuated by said sensor and controlling the energization of said servo for respectively moving said member in the speed increasing and decreasing directions as the speed detected by said sensor falls below and rises above the prevailing speed setting of the sensor, means responsive to each speed change detected by said sensor to modify said control force and bring the primer mover back to a constant speed corresponding to the prevailing position of said setter whereby to provide for isochronous operation of the prime mover, a connection transmitting the motion of said servo member back to said second abutment so as to vary said spring force with the movements of the servo member whereby to provide for operation of the governor with speed droop, and means for decreasing the motion transmitting ratio of said connection progressively with the movements of said speed setter and correspondingly decrease the speed droop substantially zero at said second speed setting.

6. A speed governor as defined in claim 5 in which the droop producing connection includes a lever whose motion transmitting ratio decreases with the speed increasing movement of said speed setter.

7. A speed governor as defined in claim 5 in which the droop producing connection includes a lever connected at one end to said servo member and to said second abutment at a point near the other end of the lever, and means connecting said lever and said speed setter to define the fulcrum of said lever and provide for shifting of the fulcrum to and from said abutment connecting point at which the lever ratio is zero.

8. A speed governor as defined in claim 7 in which the fulcrum defining means is a pin and slot connection with the slot extending lengthwise of the lever and having a portion overlying said connecting point for movement of said pin into a position alined with the connecting point.

9. A speed governor as defined in claim 7 in which the fulcrum defining means is a pin and slot connection with the pin thereof fixed to and movable with the speed setter and extending transversely of the lever, the slot of the connection being in said lever and extending lengthwise thereof with one portion of the slot overlying said connecting point.

10. In combination with a speed governor having a power servo including a driven member adapted for connection with a speed regulator of a prime mover and movable back and forth in speed increasing and decreasing directions, a rotary speed sensor adapted to be driven by said prime mover to derive a control force which increases and decreases with the sensor speed, a speeder spring opposing said control force and exerting a force determined by the position of a movable abutment, a speed setter selectively adjustable to move said abutment back and forth between a low speed setting and a high speed setting, means actuated by said sensor and controlling the energization of said servo for respectively moving said member in the speed increasing and decreasing directions as the speed detected by said sensor falls below and rises above the prevailing speed setting of the sensor, and means responsive to each speed change detected by said sensor to modify said control force and bring the prime mover back to a constant speed corresponding to the prevailing position of said setter whereby to provide for isochronous operation of the prime mover, the improvement comprising, droop mechanism responsive to movements of said servo member and operable to override said last-mentioned means, said droop mechanism including means for modifying the force opposing said control force whereby to provide for operation of the governor with speed droop and having a movable actuator changing said opposing force in accordance with the position of the actuator, a lever having a fulcrum movable along the lever toward and away from said actuator and having a point of connection with said actuator, said lever also being connected to said servo member to transmit the motion thereof to said actuator and move the latter with a ratio determined by spacing said fulcrum from said point of connection, and means shifting said fulcrum along said lever toward said point in response to movement of said speed setter from said low speed setting toward said high speed setting to decrease said ratio as the speed setting is increased, said shifting means bringing said fulcrum into substantial alinement with said point at said high speed setting thereby to disable said droop mechanism and substantially cancel the speed droop.

11. The combination defined by claim 10 in which the changing speed droop of the governor is achieved through a second spring acting between said sensor and said abutment to oppose said speeder spring, said actuator engaging said second spring to increase its force as the actuator is moved in one direction by said servo member through said lever.

12. The combination defined by claim 10 in which said lever is connected at one end to said servo member and has near its opposite end a longitudinal slot having a portion overlying said point of connection, said fulcrum comprising a pin extending transversely into said slot and supported by said shifting means for movement back and forth along the slot into and out of said overlying portion.

13. The combination defined by claim 12 in which said shifting means comprise an element on said speed setter movable longitudinally of said lever during movement of the latter between said speed settings, and a support carrying said pin and connected to said element to move said pin along said slot.

14. The combination defined by claim 13 in which said speed setter moves along an arcuate path and said element is an eccentric movably connected to said support to move the same longitudinally during arcuate movement of said eccentric.

References Cited

UNITED STATES PATENTS

| 2,364,115 | 12/1944 | Whitehead | 91—366 |
| 2,452,088 | 10/1948 | Whitehead | 91—366 |
| 2,669,973 | 2/1954 | Parker | 91—366 |
| 2,941,601 | 6/1960 | Best | 91—366 |
| 3,071,009 | 1/1963 | Stearns | 91—366 |
| 2,715,892 | 8/1955 | Rodeck et al. | 91—387 |

PAUL E. MASLOUSKY, *Primary Examiner.*